United States Patent
Park

(10) Patent No.: US 10,558,597 B2
(45) Date of Patent: Feb. 11, 2020

(54) APPLICATION PROCESSOR AND INTEGRATED CIRCUIT INCLUDING INTERRUPT CONTROLLER

(71) Applicant: SAMSUNG ELECTRONICS CO., LTD., Suwon-Si, Gyeonggi-Do (KR)

(72) Inventor: Jeongwoo Park, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 79 days.

(21) Appl. No.: 15/683,907

(22) Filed: Aug. 23, 2017

(65) Prior Publication Data

US 2018/0203812 A1    Jul. 19, 2018

(30) Foreign Application Priority Data

Jan. 13, 2017 (KR) .......................... 10-2017-0006281

(51) Int. Cl.
| | |
|---|---|
| *G06F 13/362* | (2006.01) |
| *G06F 13/24* | (2006.01) |
| *G06F 13/28* | (2006.01) |
| *G06F 13/18* | (2006.01) |
| *G06F 13/34* | (2006.01) |

(52) U.S. Cl.
CPC .............. *G06F 13/24* (2013.01); *G06F 13/18* (2013.01); *G06F 13/28* (2013.01); *G06F 13/34* (2013.01); *G06F 13/362* (2013.01)

(58) Field of Classification Search
None
See application file for complete search history.

(56) References Cited

U.S. PATENT DOCUMENTS

| | | | | |
|---|---|---|---|---|
| 5,555,420 | A | 9/1996 | Sarangdhar et al. | |
| 6,496,517 | B1 | 12/2002 | Gehman et al. | |
| 6,764,017 | B2 * | 7/2004 | Chen ..................... | G06K 19/07 235/492 |
| 7,685,347 | B2 * | 3/2010 | Gibbs ..................... | G06F 13/26 710/264 |
| 8,825,926 | B2 | 9/2014 | Justice et al. | |
| 9,298,251 | B2 * | 3/2016 | Lee ........................ | G06F 1/3243 |

(Continued)

FOREIGN PATENT DOCUMENTS

| | | |
|---|---|---|
| KR | 1019980078303 | 11/1998 |
| KR | 1020040110167 A | 12/2004 |
| KR | 1020110067795 A | 6/2011 |

*Primary Examiner* — Elias Mamo

(74) *Attorney, Agent, or Firm* — Volentine, Whitt & Francos, PLLC

(57) ABSTRACT

An application processor includes: a plurality of interrupt sources to which a plurality of interrupt numbers are respectively assigned; a Central Processing Unit (CPU) configured to receive an interrupt request signal and an interrupt number signal and perform an interrupt handling process for at least one of the plurality of interrupt sources, the at least one of the plurality of interrupt sources corresponding to the interrupt number signal; and an interrupt controller including a master interface connected to a system bus, the interrupt controller being configured to generate the interrupt request signal and the interrupt number signal based on an interrupt signal, which is received from the at least one of the plurality of interrupt sources, and to transmit the interrupt number signal to the CPU via the master interface.

18 Claims, 10 Drawing Sheets

(56) References Cited

U.S. PATENT DOCUMENTS

| | | |
|---|---|---|
| 9,355,050 B2 | 5/2016 | Zeng et al. |
| 9,449,717 B2 | 9/2016 | Becker et al. |
| 2002/0078287 A1* | 6/2002 | Shinagawa ............. G06F 13/24 710/268 |
| 2003/0105798 A1* | 6/2003 | Kim ...................... G06F 9/4812 718/105 |
| 2003/0204655 A1* | 10/2003 | Schmisseur ............ G06F 13/26 710/260 |
| 2007/0245054 A1* | 10/2007 | Wang .................... G06F 9/4825 710/261 |
| 2013/0185469 A1* | 7/2013 | Motai .................... G06F 13/24 710/267 |
| 2015/0089305 A1 | 3/2015 | Baumeister et al. |
| 2015/0194984 A1 | 7/2015 | Tsuboi et al. |
| 2016/0085568 A1 | 3/2016 | Dupre et al. |

\* cited by examiner

APPLICATION PROCESSOR AND INTEGRATED CIRCUIT INCLUDING INTERRUPT CONTROLLER

CROSS-REFERENCE TO RELATED APPLICATION

This application claims the benefit of Korean Patent Application No. 10-2017-0006281, filed on Jan. 13, 2017, in the Korean Intellectual Property Office, the disclosure of which is incorporated herein in its entirety by reference.

BACKGROUND

The disclosure relates to an application processor and an integrated circuit (IC) in a real-time environment, and more particularly, to an application processor capable of reducing a latency time during an interrupt handling process, and an IC.

With the development of ICs, a predominant trend among electronic devices, including computers, has been toward miniaturization, high reliability, high speed, and low power consumption. A digital IC, such as a system on chip (SoC), is a technology by which a complex system having various functions is integrated into a single semiconductor chip. According to a trend of convergence in which a computer, communications, and broadcasts are combined, the demand for an application-specific IC (ASIC) and an application-specific standard product (ASSP) has shifted toward SoCs. Also, miniaturization and weight reduction of information technology (IT) devices has accelerated the growth of SoC-related businesses.

When interrupt signals are generated from interrupt sources, a central processing unit (CPU) of an IC may perform an interrupt handling process. Thus, there remains a need to reduce a latency time taken for the CPU to delay the interrupt handling process.

SUMMARY

The disclosure provides an integrated circuit (IC) including an interrupt controller capable of reducing a latency time while a central processing unit (CPU) performs an interrupt handling process.

According to an aspect of the disclosure, there is provided an application processor including: a plurality of interrupt sources to which a plurality of interrupt numbers are respectively assigned; a Central Processing Unit (CPU) configured to receive an interrupt request signal and an interrupt number signal and perform an interrupt handling process for at least one of the plurality of interrupt sources, the at least one of the plurality of interrupt sources corresponding to the interrupt number signal; and an interrupt controller including a master interface connected to a system bus, the interrupt controller being configured to generate the interrupt request signal and the interrupt number signal based on an interrupt signal, which is received from the at least one of the plurality of interrupt sources, and to transmit the interrupt number signal to the CPU via the master interface.

According to another aspect of the disclosure, there is provided an integrated circuit including: first and second interrupt sources configured to respectively generate first and second interrupt signals and having first and second interrupt numbers respectively assigned to the first and second interrupt sources; an interrupt controller including a master interface; and a system bus connected to the master interface, wherein the interrupt controller is configured to receive the first and second interrupt signals from the first and second interrupt sources and generate an interrupt request signal based on at least one of the first and second interrupt signals, and the master interface is configured to output, to the system bus, an interrupt number signal regarding at least one of the first and second interrupt numbers.

According to another aspect of the disclosure, there is provided an application processor having a communication bus, an interrupt source, an interrupt controller, a central processing unit (CPU), and a tightly-coupled memory. The interrupt source generates an interrupt signal that is communicated to the interrupt controller. The interrupt controller generates, in response to receiving the interrupt signal from the interrupt source, an interrupt request signal and an interrupt number, corresponding to the interrupt request signal, identifying the interrupt source. The CPU receives, from the interrupt controller, the interrupt request signal and the interrupt number. The tightly-coupled memory stores the interrupt request signal and the interrupt number received by the CPU. In response to receiving the interrupt request signal, the CPU: (1) stores, in the tightly-coupled memory, data pertaining to an interrupted operation being executed at the time the interrupt request signal is received by the CPU, (2) retrieves the interrupt number stored by the tightly-coupled memory through direct communication that does not employ the communication bus, and (3) communicates an interrupt-processing command to the interrupt source through the communication bus.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
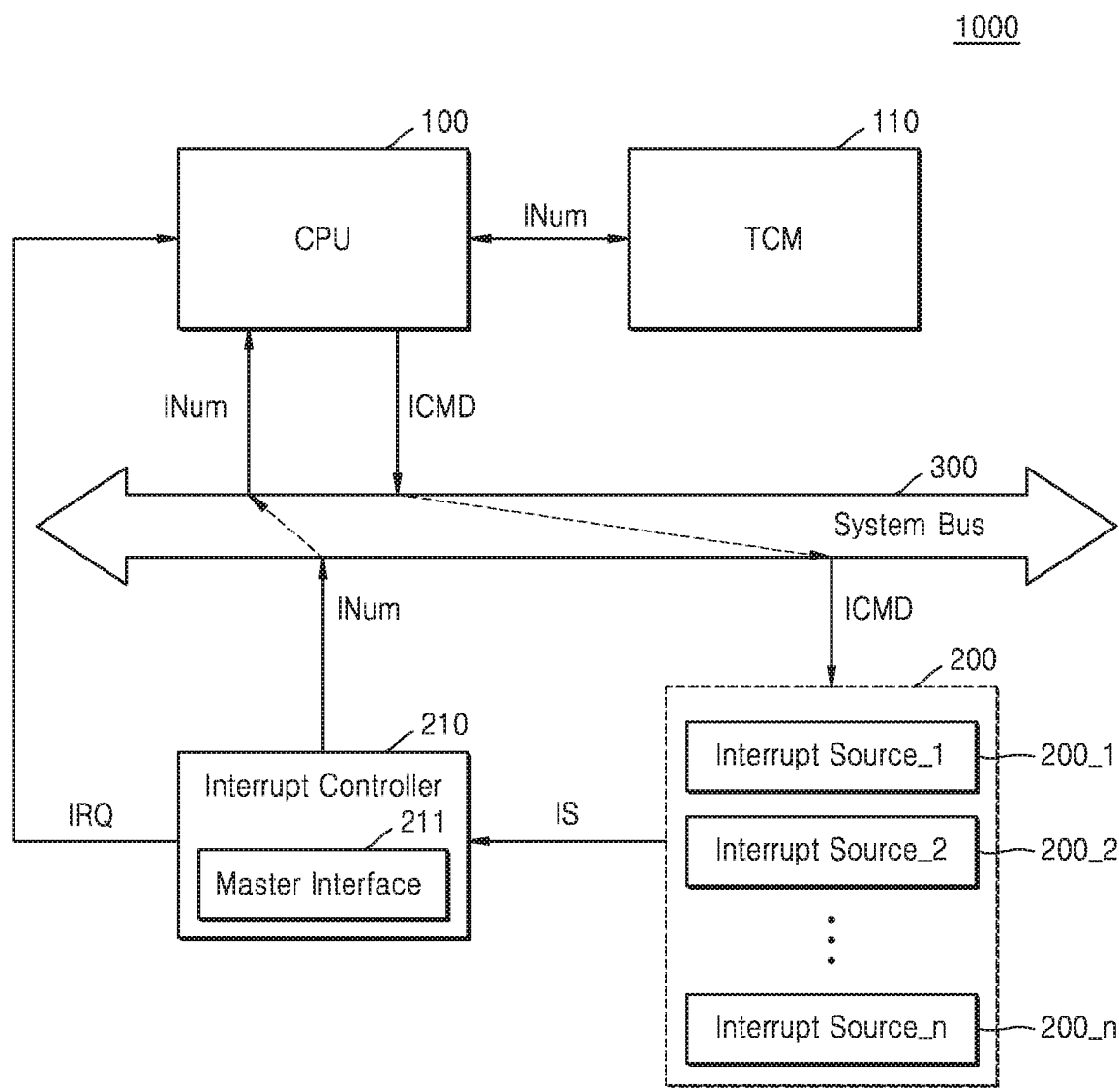
FIG. 1 is a block diagram of an integrated circuit (IC) according to an embodiment.

FIG. 1 is a block diagram of an integrated circuit (IC) 1000 according to an embodiment.

The IC 1000 may be a controller or a processor that controls an operation of an electronic system. According to embodiments, the IC 1000 may be a System on Chip (SoC), an Application Processor (AP), a mobile AP, or a control chip.

The IC 1000 may be mounted on an electronic device such as a laptop computer, a smart phone, a table Personal Computer (PC), a Personal Digital Assistant (PDA), an Enterprise Digital Assistant (EDA), a digital camera, a Portable Multimedia Player (PMP), a Portable Navigation Device (PND), a handheld game console, a Mobile Internet Device (MID), a multimedia device, a wearable computer, an Internet of Things (IoT) device, an Internet of Everything (IoE) device, or an e-book reader.

Referring to FIG. 1, the IC 1000 may include a Central Processing Unit (CPU) 100, a memory 110, interrupt sources 200, and an interrupt controller 210. Each of the CPU 100, the memory 110, the interrupt sources 200, and the interrupt controller 210 may be a master block or a slave block. The master block and the slave block may each perform a certain function in the IC 1000. The master block and the slave block may be classified based on whether the master block and the slave block have authority to use a system bus 300.

The interrupt sources 200 may include first to $n^{th}$ interrupt sources 200_1 to 200_n. In this case, n may be a natural number equal to or greater than 2. The interrupt sources 200 may generate an interrupt signal IS and output the generated interrupt signal IS to the interrupt controller 210.

In an embodiment, the interrupt sources 200 may be Intellectual Properties (IPs) for performing certain operations within a system and may be components that form the IC 1000. The interrupt sources 200 may correspond to certain modules, for example, video modules, sound modules, display modules, memory modules, communication modules, or camera modules. For example, the interrupt sources 200 may be software. In this case, the CPU 100 may execute software stored in a Random Access Memory (RAM) and thus may perform an interrupt handling process. However, the interrupt sources 200 are not limited to software.

The interrupt controller 210 may receive the interrupt signals IS from the interrupt sources 200. The interrupt controller 210 may generate an Interrupt Request Signal (IRQ) based on the interrupt signal IS and may transmit the interrupt request signal IRQ to the CPU 100. Also, an interrupt number signal INum regarding an interrupt number corresponding to the interrupt signal IS may be transmitted to the CPU 100 via the system bus 300.

The interrupt controller 210 may include a master interface 211. The master interface 211 may output the interrupt number signal INum to the system bus 300.

The CPU 100 may execute or process programs and/or data stored in a Read Only Memory (ROM) and/or the RAM. According to an embodiment, the CPU 100 may execute the programs stored in a ROM and/or RAM. The ROM may store the programs and/or data and may be embodied as an Erasable Programmable Read Only Memory (EPROM), an Electrically Erasable Programmable Read Only Memory (EEPROM), or the like. Also, the RAM may be embodied as a memory such as a Dynamic RAM (DRAM) or a Static RAM (SRAM).

The CPU 100 may be directly connected to the interrupt controller 210 or connected to the interrupt controller 210 via the system bus 300. For example, the CPU 100 may directly receive the interrupt request signal IRQ from the interrupt controller 210 without using the system bus 300. Alternatively, the CPU 100 may receive the interrupt number signal INum via the system bus 300. The CPU 100 may output, to the system bus 300, an interrupt processing command ICMD for one of the interrupt sources 200 that corresponds to the interrupt number signal INum among the interrupt sources 200, based on the received interrupt number signal INum.

The CPU 100 may be directly connected to the memory 110 without using the system bus 300. Thus, when handling processes need to be performed quickly, the CPU 100 may store data regarding the above handling processes in the memory 110 directly connected to the CPU 100 and then may perform the handling processes by using the memory 110. The CPU 100 may transmit the interrupt number signal INum to the memory 110 and may store an interrupt number in the memory 110.

The memory 110 may be, for example, a Tightly Coupled Memory (TCM). Thus, the memory 110 may be placed closely to the CPU 100 and may get accessed by the CPU 100 in a relatively short time, e.g., in a time taken for one cycle or in a time taken for several cycles. In particular, the memory 110 may be connected to the CPU 100 via a dedicated channel and thus may function as a dedicated memory of the CPU 100.

In the present embodiment, the memory 110 may store an interrupt number that is information regarding the interrupt sources 200 and may store valid information that may be used to determine validity of the stored interrupt number. In an embodiment, the memory 110 may include SRAM.

The interrupt sources 200 may receive the interrupt processing command ICMD via the system bus 300 and may perform a certain operation in the electronic system. Also, the interrupt sources 200 may stop generating the interrupt signals IS.

The system bus 300 may connect the master blocks to the slave blocks. The master blocks may access the slave blocks via the system bus 300, whereas the slave blocks may be controlled by the master blocks via the system bus 300. For example, the CPU 100 may be the master block, and the interrupt sources 200 and the interrupt controller 210 may be the slave blocks. However, the disclosure is not limited thereto. In some cases, the interrupt controller 210 may be the master block and thus may access the CPU 100 via the system bus 300. When the interrupt number signal INum is transmitted to the CPU 100 via the system bus 300, the interrupt controller 210 may be the master block, and the CPU 100 may be the slave block.

For example, the system bus 300 may include a read address (AR) channel, a write address (AW) channel, a write response (B) channel, a read response (R) channel, or a write data (W) channel according to AXI4 specifications.

The system bus 300 may be embodied as a bus to which protocols having certain bus standards are applied. For example, Advanced RISC Machine (ARM)'s Advanced Microcontroller Bus Architecture (AMBA) protocols may be applied as the bus standards. Buses according to the AMBA protocols may be an Advanced High-Performance Bus (AHB), an Advanced Peripheral Bus (APB), an Advanced eXtensible Interface (AXI), AXI4, AXI Coherency Extensions (ACE), and the like. Among the above-listed buses, the AXI is an interface protocol between functional blocks and provides a multiple outstanding address function, a data interleaving function, etc. In addition, a protocol such as SONIC's uNetwork, IBM's Core-Connect, or OCP-IP's Open Core Protocol may be applied to the system bus 300.

Figure 2:
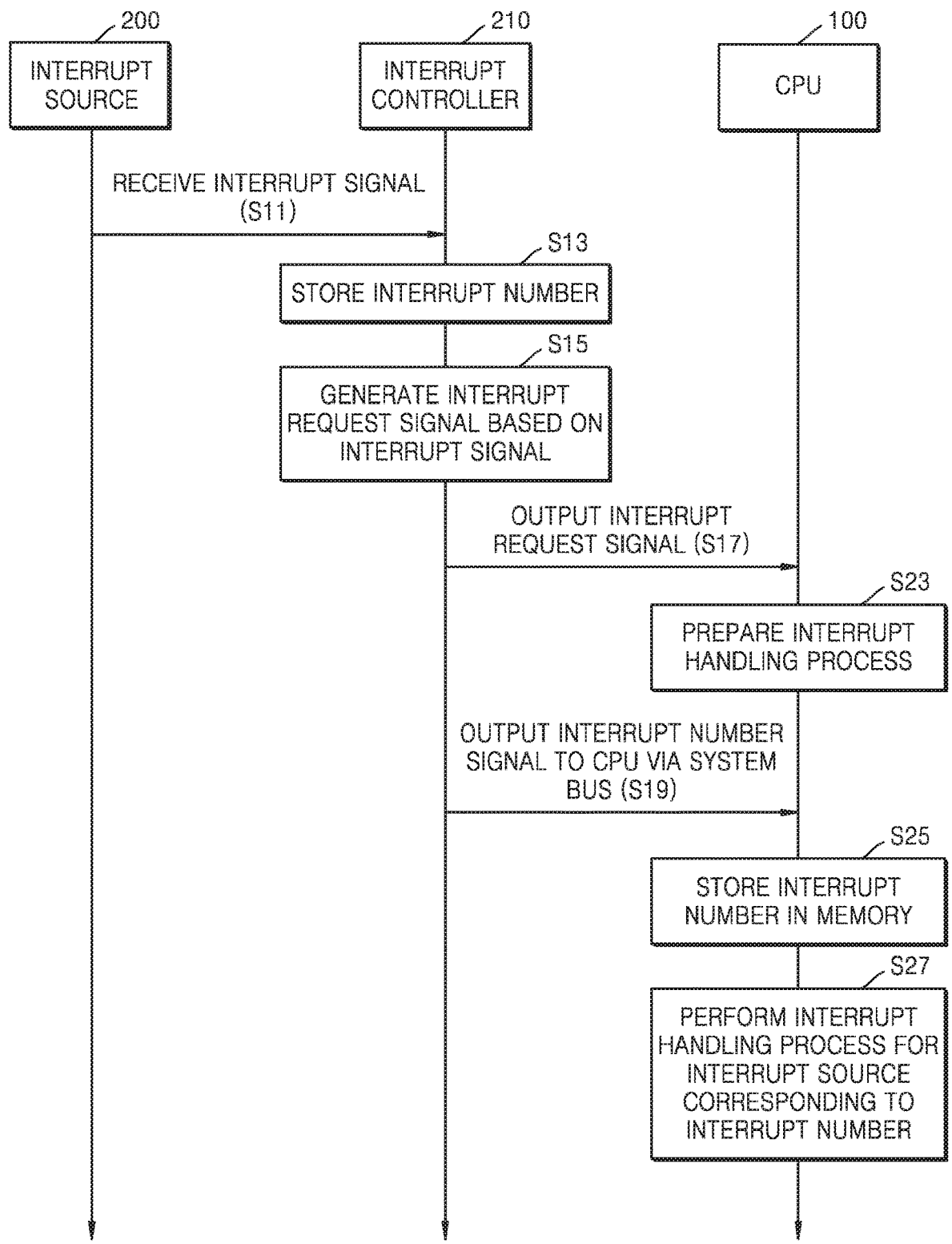
FIG. 2 is a flowchart of an operation of an interrupt controller included in an IC, according to an embodiment.

FIG. 2 is a flowchart of an operation of the interrupt controller 210 included in an IC 1000, according to an embodiment. FIG. 2 shows operations of the interrupt controller 210 and the CPU 100.

Referring to FIGS. 1 and 2, the interrupt controller 210 may receive an interrupt signal IS in operation S11. In operation S13, the interrupt controller 210 may store an interrupt number corresponding to the interrupt signal IS. The interrupt number may be information regarding one of the interrupt sources 200, used to generate an activated interrupt signal IS. Each of the first to $n^{th}$ interrupt sources 200_1 to 200_$n$ may activate the interrupt signal IS when interrupts need to be processed. For example, when interrupts need to be handled, each of the first to $n^{th}$ interrupt sources 200_1 to 200_$n$ may generate an interrupt signal IS having a first logic level, e.g., 1, and activate the interrupt signal IS, and when the interrupts do not need to be processed, the interrupt sources 200 may generate an interrupt signal IS having a second logic level, e.g., 0, and inactivate the interrupt signal IS.

In operation S15, the interrupt controller 210 may generate an interrupt request signal IRQ based on the interrupt signal IS. Operation S13, in which the interrupt number is stored in the interrupt controller 210, and operation S15, in which the interrupt request signal IRQ is generated, are not limited to being performed in the order shown in FIG. 2.

In operation S17, the interrupt controller 210 may output the interrupt request signal IRQ to the CPU 100. Since the interrupt controller 210 may be directly connected to the CPU 100, the interrupt request signal IRQ may be directly transmitted to the CPU 100 without using the system bus 300. On the contrary, the interrupt number signal INum including the information about the interrupt number may be output to the CPU 100 via the system bus 300. As a result, in operation S19, the interrupt number signal INum may be transmitted to the CPU 100 via the system bus 300. In this case, with regard to the interrupt number signal INum, the interrupt controller 210 may be the master block, and the CPU 100 may be the slave block.

Referring to FIG. 2, after operation S17 in which the interrupt request signal IRQ is output to the CPU 100, operation S19, in which the interrupt number signal INum is output to the CPU 100 via the system bus 300, is performed. However, operations S17 and S19 may be simultaneously performed.

The CPU 100 may directly receive the interrupt request signal IRQ from the interrupt controller 210. When the interrupt request signal IRQ is transmitted to the CPU 100, the CPU 100 may stop performing operations which were being performed before receiving the interrupt request signal IRQ, and may store data regarding the operations. When the data is completely stored, the CPU 100 may perform an interrupt handling preparation process in operation S23.

In operation S25, the CPU 100 may receive the interrupt number signal INum from the system bus 300 and may store the interrupt number in the memory 110. Although the interrupt controller 210 concurrently outputs the interrupt request signal IRQ and the interrupt number signal INum, a point in time when the interrupt request signal IRQ reaches the CPU 100 may differ from a point in time when the interrupt number signal INum reaches the CPU 100. Thus, when the CPU 100 prepares for performing the interrupt handling process, the CPU 100 may receive the interrupt number signal INum. Operation S23 in which the CPU 100 prepares for performing the interrupt handling process may overlap operation S25 in which the interrupt number is stored in the memory 110.

When finishing preparation for the interrupt handling process, the CPU 100 may perform, in operation S27, the interrupt handling process for one of the interrupt sources 200 that corresponds to the interrupt number, based on the interrupt number stored in the memory 110.

Since the IC 1000 according to an embodiment includes the interrupt controller 210 that outputs the interrupt number signal INum without receiving a separate command from the CPU 100, the CPU 100 may quickly receive information regarding one of the interrupt sources 200 from the memory 110 when the CPU 100 finishes preparing for performing the interrupt handling process. As a result, latency according to the interrupt handling may be reduced.

Figure 3:
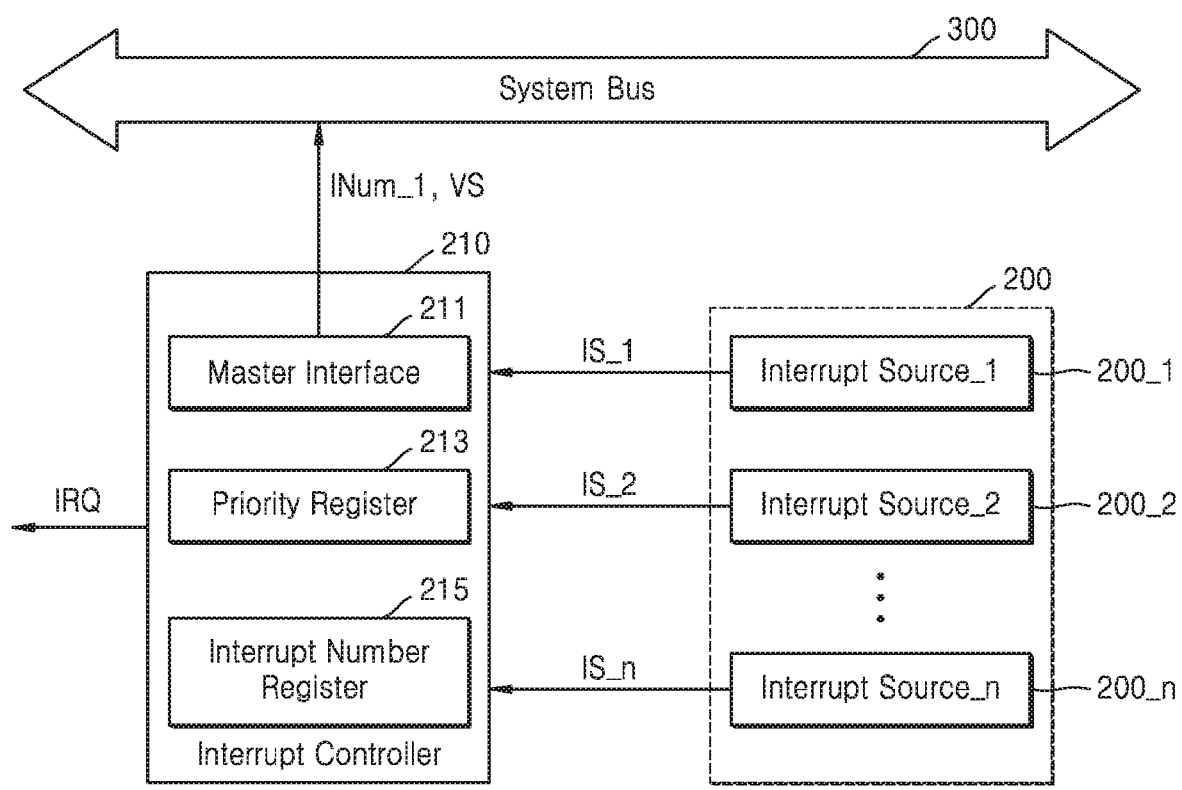
FIG. 3 is a block diagram of an IC according to an embodiment, which explains an operation of an interrupt controller.
Figure 4:
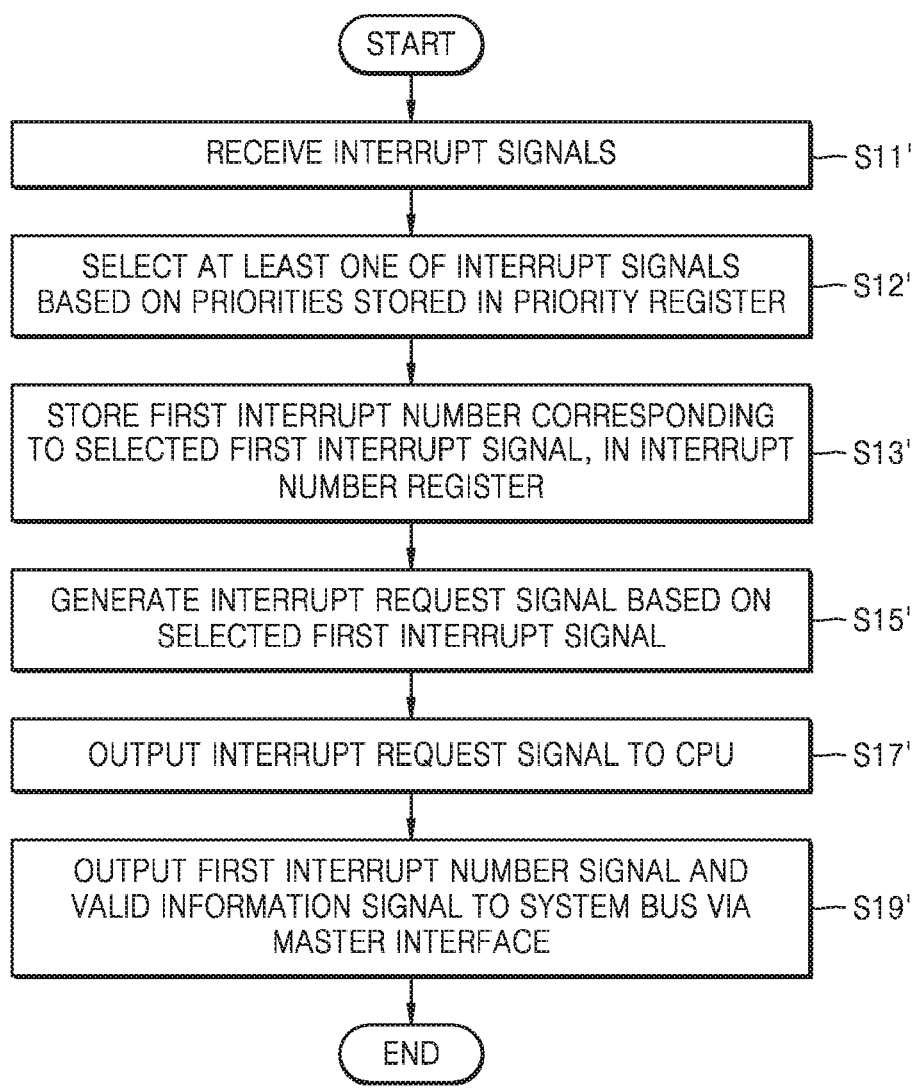
FIG. 4 is a flowchart of an operation of an interrupt controller included in an IC, according to an embodiment.

FIG. 3 is a block diagram of the IC 1000 according to an embodiment, which explains an operation of the interrupt controller 210. FIG. 4 is a flowchart of an operation of the interrupt controller 210 included in the IC 1000, according to an embodiment. Like reference numerals in FIGS. 1 and 3 denote like elements, and detailed descriptions thereof are omitted for convenience.

Referring to FIGS. 3 and 4, the interrupt sources 200 may include first to $n^{th}$ interrupt sources 200_1 to 200_$n$. The interrupt controller 210 may include the master interface 211, a priority register 213, and an interrupt number register 215.

The first to $n^{th}$ interrupt sources 200_1 to 200_$n$ may respectively generate first to $n^{th}$ interrupt signals IS_1 to IS_n and may output the generated first to $n^{th}$ interrupt signals IS_1 to IS_n to the interrupt controller 210. Also, first to $n^{th}$ interrupt numbers may be respectively assigned to the first to $n^{th}$ interrupt sources 200_1 to 200_$n$. Therefore, the CPU 100 may identify which interrupt sources generate interrupt signals, based on the first to $n^{th}$ interrupt numbers.

An interrupt signal for which two or more of the interrupt sources 200 are activated may be generated. For example, the first and second interrupt sources 200_1 and 200_2 among the interrupt sources 200 may respectively generate the first and second interrupt signals IS_1 and IS_2, and the first and second interrupt signals IS_1 and IS_2 may be activated. Thus, in operation S11', the interrupt controller 210 may receive interrupt signals including at least one activated interrupt signal.

The priority register 213 may receive the first and second interrupt signals IS_1 and IS_2 which are activated. Priorities of the first to $n^{th}$ interrupt signals IS_1 to IS_n may be stored in the priority register 213. When activated interrupt signals are simultaneously input to the interrupt controller 210, the interrupt controller 210 may select at least one interrupt signal having a high priority from among the first to $n^{th}$ interrupt signals IS_1 to IS_n, based on the stored priorities. For example, in operation S12', when the activated first and second interrupt signals IS_1 and IS_2 are simultaneously input to the interrupt controller 210, the interrupt controller 210 may select the first interrupt signal IS_1 having a high priority, based on the stored priorities.

In operation S13', the interrupt controller 210 may store an interrupt number corresponding to the selected first interrupt signal IS_1 in the interrupt number register 215. When only the first interrupt signal IS_1 among the first to $n^{th}$ interrupt signals IS_1 to IS_n input to the interrupt controller 210 is activated, operation S13' may also be performed. In addition, when three or more interrupt signals are activated, operation S13' may also be performed.

In operation S15', the interrupt controller 210 may generate an interrupt request signal IRQ based on the selected first interrupt signal IS_1. Operation S13', in which a first interrupt number is stored in the interrupt number register 215, and operation S15', in which the interrupt request signal IRQ is generated, are not limited to being performed in the order shown in FIG. 3.

In operation S17', the interrupt controller 210 may output the interrupt request signal IRQ to the CPU 100. In this case, the interrupt request signal IRQ may be directly transmitted to the CPU 100 without using the system bus 300.

In operation S19', a first interrupt number signal INum_1 including information about the first interrupt number stored in the interrupt number register 215 may be output to the system bus 300 from the master interface 211. In operation S19', along with the first interrupt number signal INum_1, a valid information signal VS including information used to determine validity of the first interrupt number may be output to the system bus 300 from the master interface 211. However, the embodiment is not limited thereto. The first interrupt number signal INum_1 may only be output to the system bus 300 from the master interface 211.

The master interface 211 may have authority to use the system bus 300 and may access the CPU 100 via the system bus 300. The first interrupt number signal INum_1 may be transmitted to the CPU 100 via the system bus 300.

Operation S17', in which the interrupt request signal IRQ is output to the CPU 100, may overlap operation S19', in which the first interrupt number signal INum_1 and the valid information signal VS are output to the system bus 300. For example, the interrupt request signal IRQ, the first interrupt number signal INum_1, and the valid information signal VS may be concurrently output from the interrupt controller 210. However, the embodiment is not limited thereto. The interrupt number signal INum_1 and the valid information signal VS may be output from the master interface 211 after the interrupt request signal IRQ is output from the interrupt controller 210.

Figure 5:
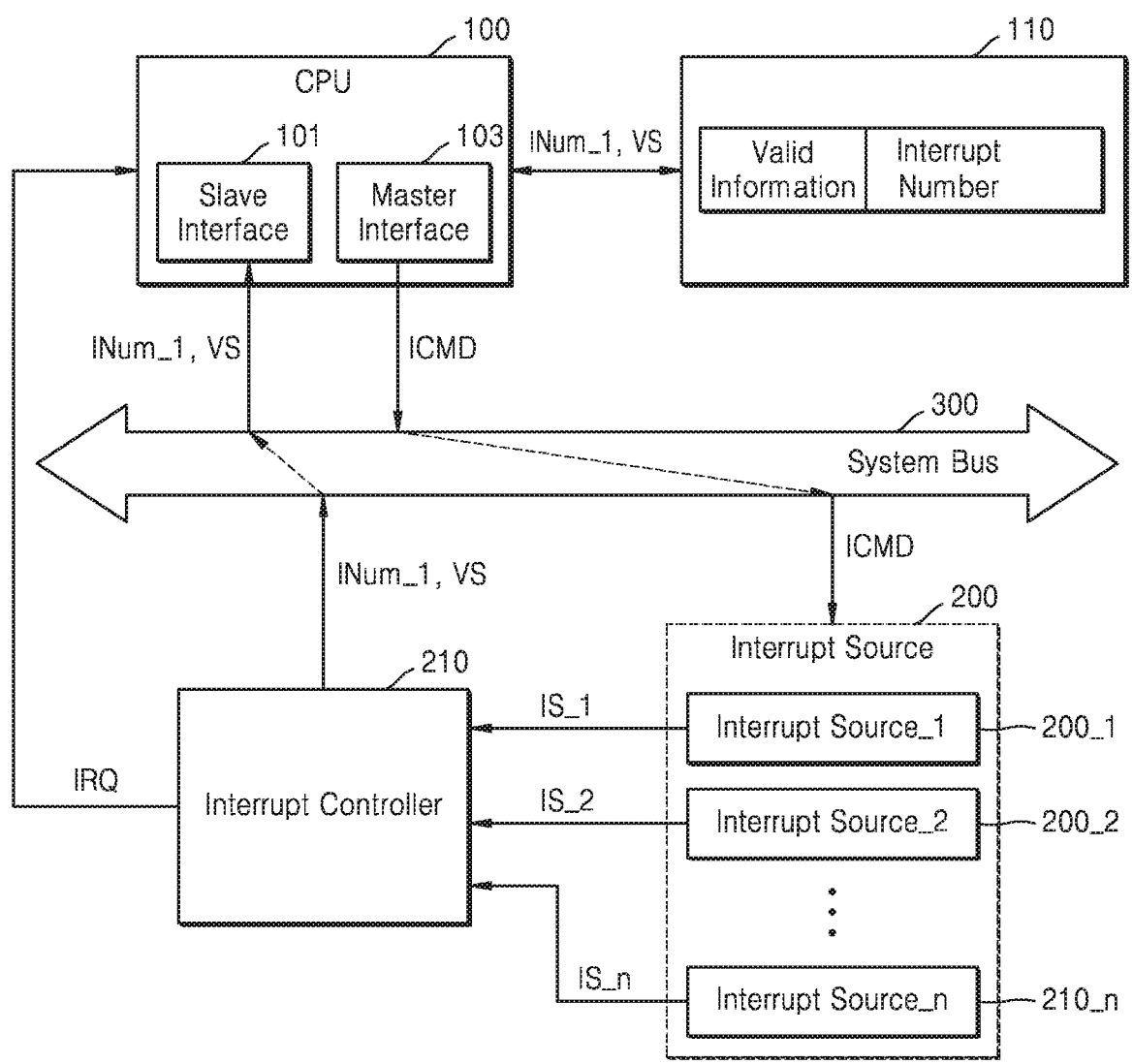
FIG. 5 is a block diagram of an IC according to an embodiment, which explains an operation of a central processing unit (CPU)
Figure 6:
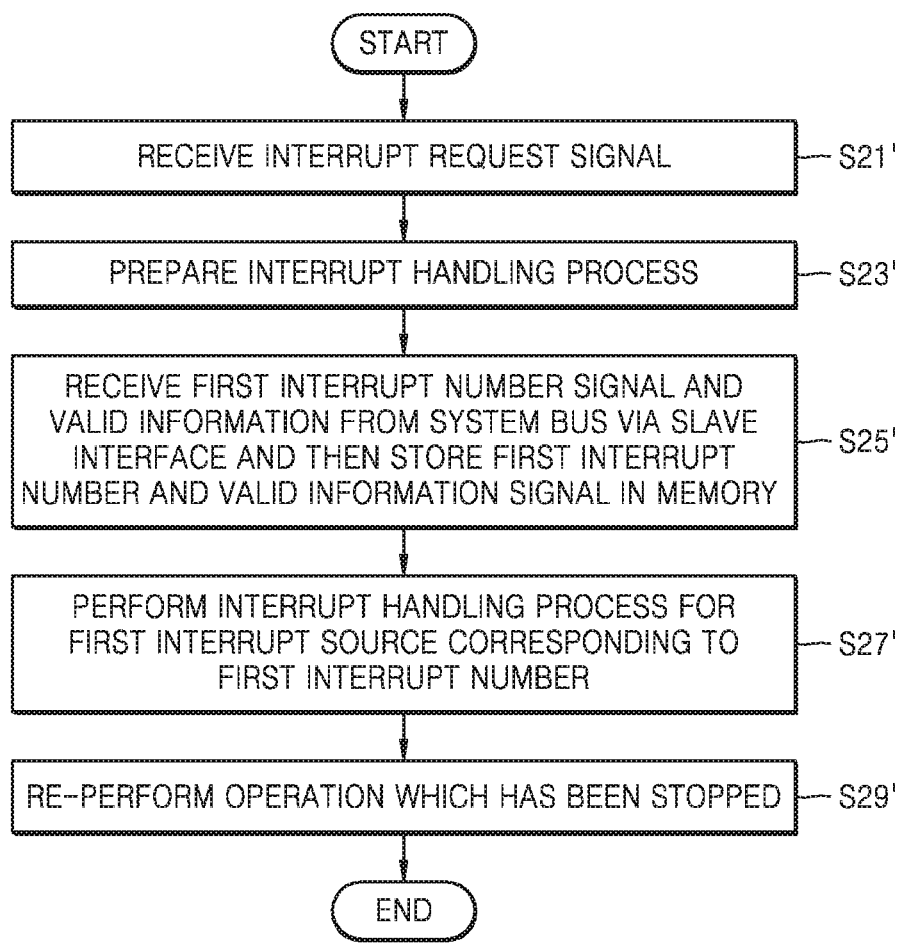
FIG. 6 is a flowchart of an operation of a CPU of an IC, according to an embodiment.

FIG. 5 is a block diagram of the IC 1000 according to an embodiment, which explains an operation of CPU 100. FIG. 6 is a flowchart of the CPU 100 of the IC 1000, according to an embodiment. Like reference numbers in FIGS. 1, 3, 5, and 6 denote like elements, and detailed descriptions thereof are omitted for convenience.

Referring to FIGS. 5 and 6, the CPU 100 may include a slave interface 101 and a master interface 103. The slave interface 101 may be controlled by the master interface 211 of the interrupt controller 210 of FIG. 3. The master interface 103 may have authority to use the system bus 300 and may access the interrupt sources 200 via the system bus 300.

In operation S21', the CPU 100 may directly receive the interrupt request signal IRQ from the interrupt controller 210. When the CPU 100 receives the interrupt request signal IRQ, the CPU 100 stops performing operations which were being performed before receiving the interrupt request signal IRQ, and may prepare for the interrupt handling process, e.g., storing data regarding the operations, in operation S23'.

In operation S25', the CPU 100 may receive the first interrupt number signal INum_1 and the valid information signal VS from the system bus 300 via the slave interface 101 and may store the first interrupt number and valid information in the memory 110. However, the disclosure is not limited thereto. The CPU 100 may receive only the first interrupt number signal INum_1 from the system bus 300 via the slave interface 101 and may store only the first interrupt number in the memory 110.

A time at which the CPU 100 receives the interrupt request signal IRQ may differ from a time at which the CPU 100 receives the first interrupt number signal INum_1. As described above with reference to FIGS. 3 and 4, a difference between the times results from a difference between a path via which the interrupt request signal IRQ is output and a path via which the first interrupt number signal INum_1 is output, even though it is assumed that the interrupt controller 210 simultaneously outputs the interrupt request signal IRQ and the first interrupt number signal INum_1. When signals are transmitted to the CPU 100 via the system bus 300, a transmission rate may be lower than a transmission rate during direct transmission of the signals. Thus, the CPU 100 may receive the first interrupt number signal INum_1 and the valid information signal VS after receiving the interrupt request signal IRQ. This will be described in more detail with reference to FIG. 9.

While operation S25' is performed in which the CPU 100 receives the first interrupt number signal INum_1 and the valid information signal VS from the system bus 300 and the first interrupt number and the valid information are stored in the memory 110, the CPU 100 may prepare for performing the interrupt handling process in operation S23'. That is, operation 23', in which the CPU 100 prepares for performing the interrupt handling process, and operation S25', in which the first interrupt number signal INum_1 and the valid information signal VS are received and the first interrupt number and the valid information are stored in the memory 110, may be performed in parallel.

In operation S27', when preparation for the interrupt handling process has finished, the CPU 100 may perform the interrupt handling process for the first interrupt source 200_1 corresponding to the first interrupt number, based on the first interrupt number stored in the memory 110. In this case, the CPU 100 may determine validity of the first interrupt number based on the valid information stored in the memory 110. This will be described in more detail with reference to FIGS. 7 and 8.

The master interface 103 of the CPU 100 may output the interrupt processing command ICMD to the system bus 300. The master interface 103 may have authority to use the system bus 300 and may access the first interrupt source 200_1 via the system bus 300. Thus, when the interrupt processing command ICMD is transmitted to the first interrupt source 200_1 via the system bus 300, the CPU 100 may be the master block, and the first interrupt source 200_1 may be the slave block. Moreover, when the interrupt processing command ICMD is transmitted to the interrupt sources 200 via the system bus 300, the CPU 100 may be the master block, and the interrupt sources 200 may be the slave blocks.

When the interrupt handling process for the first interrupt source 200_1 is completed, operation S29' may be performed in which the CPU 100 re-performs the operations which have been stopped.

The IC 1000 according to an embodiment may store in advance information about the interrupt sources 200 in the memory 110 directly connected to the CPU 100, and when the CPU 100 finishes preparation for the interrupt handling process, the CPU 100 may quickly receive the information about the interrupt sources 200 from the memory 110. Thus, a time taken for the CPU 100 to acquire the information (e.g., interrupt numbers) about the interrupt sources 200 used to generate the interrupt signals IS may be reduced, and thus a latency with respect to interrupt handling may be reduced.

The first interrupt source 200_1 may receive the interrupt processing command ICMD via the system bus 300 and may perform a certain operation in the electronic system. Then, the first interrupt source 200_1 may inactivate the first interrupt signal IS_1. The second interrupt source 200_2 on which the interrupt handling process is not performed by the CPU 100 may keep generating the activated second interrupt signal IS_2, and when the interrupt handling process for the first interrupt source 200_1 is completed, an interrupt handling process for the second interrupt source 200_2 may be performed.

Figure 7:
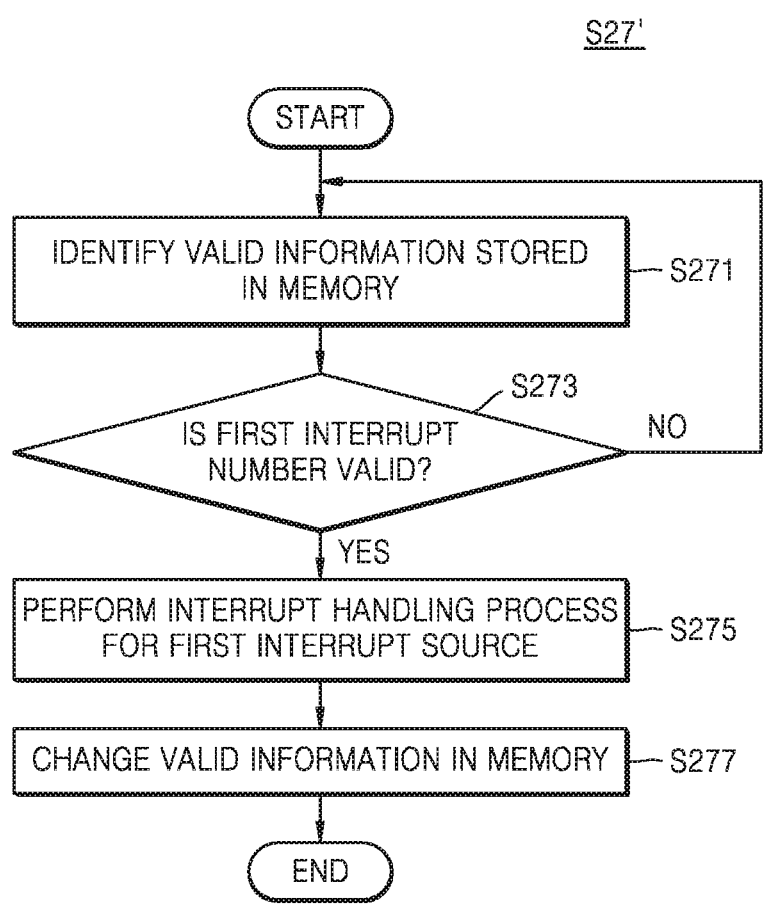
FIG. 7 is a flowchart of an operation, especially, operation S27' of FIG. 6, of a CPU of an IC, according to an embodiment.
Figure 8:
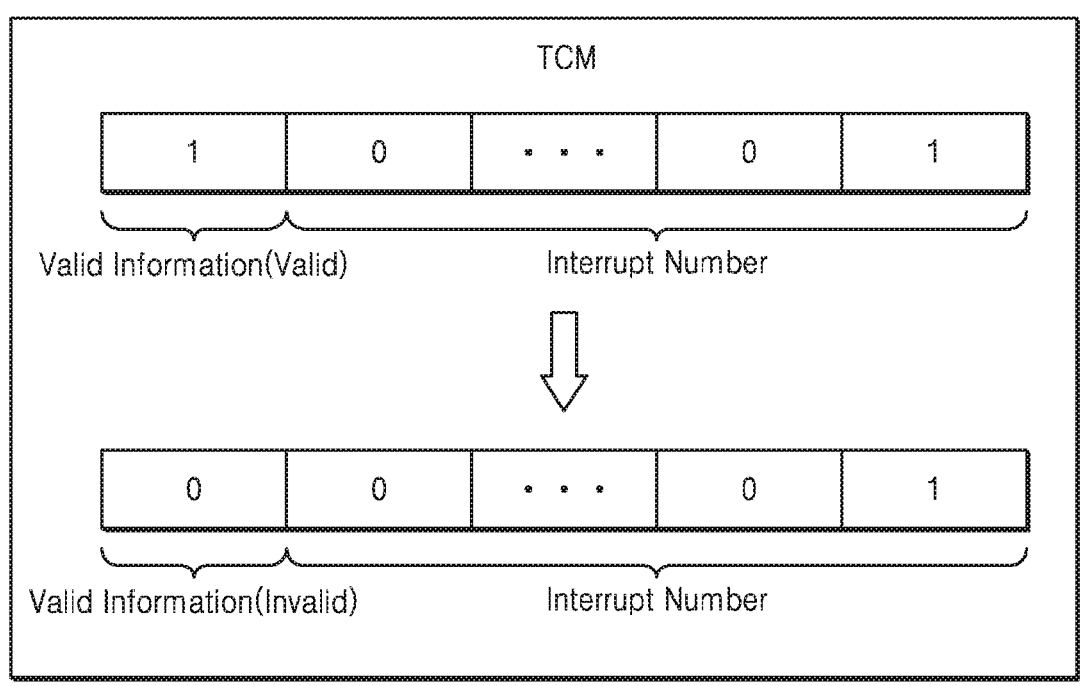
FIG. 8 is a diagram showing valid information and interrupt numbers stored in a memory of an IC, according to an embodiment.

FIG. 7 is a flowchart of an operation, especially, operation S27' of FIG. 6, of the CPU 100 of an IC, according to an embodiment. FIG. 8 is a diagram showing valid information and interrupt numbers stored in a memory of an IC, according to an embodiment.

FIG. 8 is a diagram showing valid information changed after the interrupt handling process finishes. Like reference numbers in FIGS. 1 and 5-8 denote like elements, and detailed descriptions thereof are omitted for convenience.

Referring to FIGS. 7 and 8, the CPU 100 may include the slave interface 101 and the master interface 103. The CPU 100 may receive the first interrupt number signal INum_1 and the valid information signal VS from the system bus 300 via the slave interface 101 and may transmit the first interrupt number signal INum_1 and the valid information signal VS to the memory 110. The memory 110 may store the first interrupt number and the valid information therein.

When preparation for the interrupt handling process has finished, the CPU 100 may identify the valid information stored in the memory 110, in operation S271. For example, the valid information may be 1 bit, and when the valid information has a first value (e.g., 1), the first value may indicate that a currently stored interrupt number is valid. On the contrary, when the valid information has a second value (e.g., 0), the second value may indicate that a currently stored interrupt number is invalid. That is, when the valid information has the second value, an interrupt number of an interrupt source, on which the interrupt handling process has already been performed by the CPU 100, may be stored in the memory 110. However, a value of the valid information is not limited to the first value and the second value, and the valid information is not limited to 1 bit.

In operation S273, the CPU 100 may determine whether the first interrupt number stored in the memory 110 is valid by identifying the valid information stored in the memory 110. The first interrupt number and the valid information may be stored in the memory 110 before the interrupt handling process is performed. The valid information may be 1 bit, and when the valid information has a value of 1, the first interrupt number currently stored may be valid. Thus, the CPU 100 may perform the interrupt handling process for the first interrupt source 200_1.

When it is determined that the first interrupt number is valid, operation S275 may be performed in which the interrupt handling process for the first interrupt source 200_1 corresponding to the first interrupt number is performed based on the first interrupt number. That is, the master interface 103 of the CPU 100 may output the interrupt processing command ICMD to the system bus 300.

When the interrupt handling process finishes, operation S277 may be performed in which the CPU 100 changes the valid information stored in the memory 110. The first interrupt number and the changed valid information may be stored in the memory 110 after the interrupt handling process has been performed. When the interrupt handling process for the first interrupt source 200_1 is completed, the CPU 100 may display that the first interrupt number stored in the memory 110 is now invalid by changing the value of the valid information from 1 to 0.

When the CPU 100 determines that the first interrupt number stored in the memory 110 is not valid in operation S273 after the CPU 100 finishes preparing for the interrupt handling process and identifies the valid information stored in the memory 110 in operation S271, the CPU 100 may keep identifying, in operation S271, the valid information stored in the memory 110 until the first interrupt number stored in the memory 110 is determined to be valid.

The CPU 100 stops performing the operations that were being performed before receiving the interrupt request signal IRQ. While the CPU 100 prepares for performing the interrupt handling process, e.g., storing data regarding the operations, operations of receiving the first interrupt number signal INum_1 and the valid information signal VS from the system bus 300 and of storing the first interrupt number and the valid information in the memory 110 may not be completed. In this case, the value of the valid information stored in the memory 110 may still be 0. Therefore, until the operation of storing the first interrupt number and the valid information in the memory 110 is completed and the value of the valid information stored in the memory 110 becomes 1, the CPU 100 may keep identifying the valid information stored in the memory 110 in operation S271.

When an interrupt number, which corresponds to an interrupt source 200 on which the interrupt handling process has been completed, remains stored in the memory 110, the CPU 100 may repeatedly perform the interrupt handling process based on the interrupt number. When both the interrupt number and the valid information are stored in the memory 110, the CPU 100 may determine validity of the interrupt number based on the valid information stored in the memory 110, and thus the CPU 100 may not unnecessarily perform the interrupt handling process.

Figure 9A:
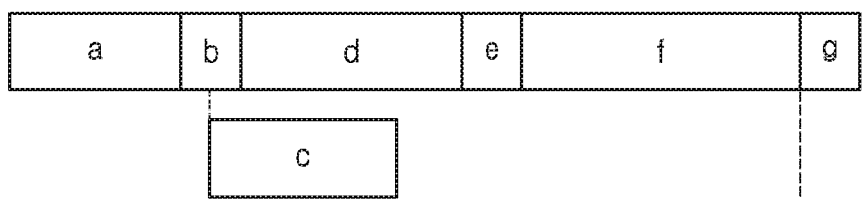
FIGS. 9A and 9B are a timing diagram of an interrupt handling process in an IC according to an embodiment, which explains a latency of the interrupt handling process.
Figure 9B:
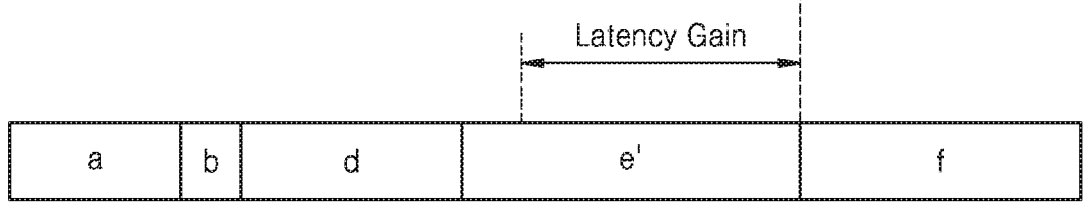

FIGS. 9A and 9B are a timing diagram of an interrupt handling process in an IC according to an embodiment and explain a latency of the interrupt handling process of the CPU 100. FIG. 9A shows an embodiment of the disclosure, and FIG. 9B shows a comparative example. In the comparative example unlike an embodiment of the disclosure, the CPU 100 may receive an interrupt number signal after the interrupt handling preparation process is completed. Referring to FIGS. 9A and 9B, a horizontal axis indicates time.

Referring to FIGS. 1, 3, 9A, and 9B, in an embodiment, each interrupt source 200 may output the interrupt signal IS, and the interrupt controller 210 may receive the interrupt signal IS. The interrupt controller 210 may select at least one of the interrupt signals IS based on the priorities stored in the priority register 213 and may store the interrupt number corresponding to the selected interrupt signal IS, in the interrupt number register 215. Based on the selected interrupt signal IS, the interrupt request signal IRQ may be generated. A first interval "a" may indicate a time taken to generate the interrupt request signal IRQ after the interrupt sources 200 generate the interrupt signals IS.

A second interval "b" may indicate a time at which the interrupt request signal IRQ is output from the interrupt controller 210 and then transmitted to the CPU 100. A third interval "c" may indicate a time taken to transmit the interrupt number signal INum, which is output from the interrupt controller 210, to the CPU 100 and store the interrupt number in the memory 110. In this case, the valid information signal VS and the interrupt number signal INum that are output from the master interface 211 of the interrupt controller 210 may be transmitted to the CPU 100 via the system bus 300, and the valid information may be stored in the memory 110.

In an embodiment, the second interval "b" may overlap the third interval "c." For example, the interrupt request signal IRQ and the interrupt number signal INum may be simultaneously output from the interrupt controller 210, but the disclosure is not limited thereto. Since the interrupt request signal IRQ is transmitted to the CPU 100 via a line directly connected to the CPU 100, the interrupt request signal IRQ may reach the CPU 100 faster than the interrupt number signal INum that is transmitted to the CPU 100 via the system bus 300.

After receiving the interrupt request signal IRQ, the CPU 100 may stop previous operations and prepare for the interrupt handling process, e.g., prepare for storing data regarding the previous operations. A fourth interval "d" may indicate a time taken to perform the interrupt handling preparation process.

Since the interrupt request signal IRQ reaches the CPU 100 faster than the interrupt number signal INum, the CPU 100 may already be prepared for performing the interrupt handling process when the CPU 100 receives the interrupt number signal INum. Thus, in an embodiment, the third and fourth intervals "c" and "d" may not be consecutively performed and may overlap each other.

When preparation for the interrupt handling process has finished, the CPU 100 may receive the interrupt number signal INum regarding the interrupt number from the memory 110. A fifth interval "e" may indicate a time taken for the CPU 100 to receive the interrupt number signal INum from the memory 110.

When receiving the interrupt number signal INum, the CPU 100 may perform the interrupt handling process regarding an interrupt source corresponding to the interrupt number signal INum. The master interface 103 of the CPU 100 may output the interrupt processing command ICMD to the system bus 300, and the interrupt processing command ICMD may be transmitted, via the system bus 300, to an interrupt source 200 among the interrupt sources 200 which is used to generate an activated interrupt signal IS. The interrupt source that receives the interrupt processing command ICMD may be used to perform a certain operation within the IC 1000. A sixth interval "f" may indicate a time taken for the CPU 100 to output the interrupt processing command ICMD to an interrupt source and for the interrupt source to complete the certain operation.

Operations in the first interval "a," the second interval "b," the fourth interval "d," and the sixth interval "f," according to the comparative example, may be performed identically with the first interval "a," the second interval "b," the fourth interval "d," and the sixth interval "f," according to an embodiment.

In the comparative example unlike an embodiment, a master interface of an interrupt controller does not transmit an interrupt number signal, and thus the second interval "b" and the fourth interval "d" of the comparative example may not overlap the nonexistent third interval "c" of the comparative example.

In the comparative example, the CPU may output a command for transmitting an interrupt number signal to the interrupt controller so that the CPU may receive the interrupt number signal. The command is transmitted to the interrupt controller via a system bus, and the interrupt controller may receive the command and transmit the interrupt number signal to the CPU via the system bus.

In the comparative example, the system bus needs to be used while the CPU receives the interrupt number signal, but in an embodiment, the CPU 100 directly receives the interrupt number signal INum from the memory 110 directly connected to the CPU 100, and thus the fifth interval "e," in which the CPU 100 receives the interrupt number signal INum, may be less than a fifth interval "e'," in which the CPU receives the interrupt number signal INum, of the comparative example. Thus, an interval from a point in time when the interrupt signal, IS, is output from the interrupt sources 200 to a point in time when the CPU 100 starts performing the interrupt handling process, that is, a latency of the interrupt handling process, may be reduced. For example, a latency gain according to an embodiment, relative to the comparative example, may be a difference between the fifth interval "e'" of the comparative example and the fifth interval "e" of an embodiment.

In an embodiment, in a case where the valid information is separately stored in the memory 110, when the CPU 100 completes the interrupt handling process, a seventh interval "g" in which the valid information is changed may be added. Since the CPU 100 is directly connected to the memory 110, the seventh interval "g" may be similar to the fifth interval "e."

Figure 10:
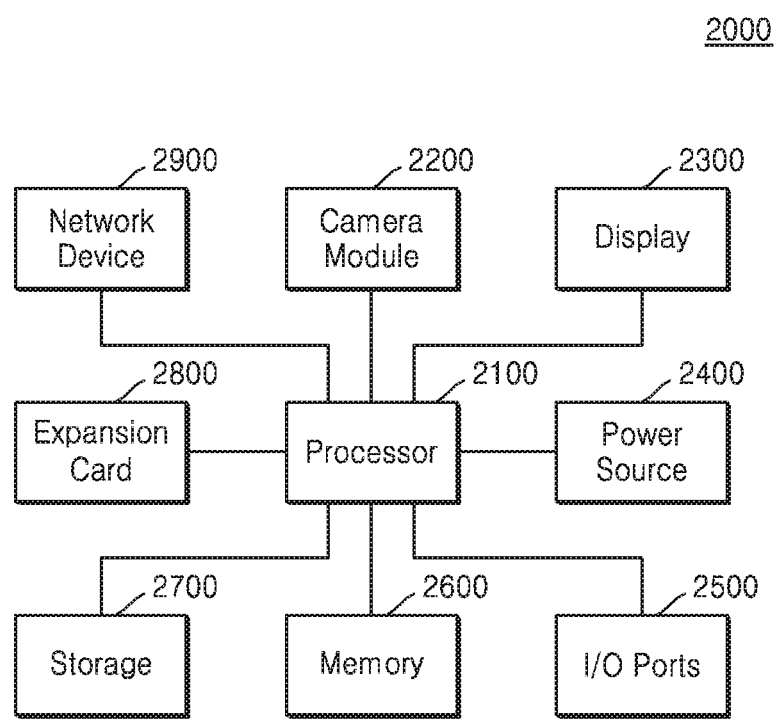
FIG. 10 shows an example of an electronic system including an IC, according to an embodiment.

FIG. 10 shows an example of an electronic system 2000 including the IC 1000, according to an embodiment.

Referring to FIG. 10, the electronic system 2000 may be a portable electronic device and may be embodied as a mobile phone, a smart phone, a tablet PC, a laptop computer, a PDA, an EDA, a digital camera, a PMP, a PND, a handheld game console, an e-book reader, or the like. The electronic system 2000 may include a processor 2100, a camera module 2200, a display 2300, a power source 2400, input/output (I/O) ports 2500, a memory 2600, a storage 2700, an expansion card 2800, and a network device 2900.

The processor 2100 may be a multi-core processor and may control components of the electronic system 2000, i.e., the camera module 2200, the display 2300, the power source 2400, the I/O ports 2500, the memory 2600, the storage 2700, the expansion card 2800, and the network device 2900. The processor 2100 may be, for example, an AP. The processor 2100 may include the IC 1000 according to an embodiment.

The camera module 2200 may include a lens and an image sensor and may provide the processor 2100 with image data corresponding to optical images. The display 2300 may display an image or a video based on data received from the processor 2100. The power source 2400 may include a battery and a battery controller and may supply power to each component of the electronic system 2000. The I/O ports 2500 may be used to transmit data to the electronic system 2000 from the outside or transmit data of the electronic system 2000 to the outside and may be embodied as, for example, universal serial bus (USB) ports. The memory 2600 may store data necessary to operate the electronic system 2000, for example, data generated by the processor 2100, or the like.

The storage 2700 may have relatively large data storage capacity and may store programs and data such as multimedia data in a non-volatile manner Thus, although power supplied to the IC 1000 according to an embodiment is interrupted, the stored data may not be lost. For example, the storage 2700 may include a non-volatile memory, e.g., EEPROM, flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), or Ferroelectric Random Access Memory (FRAM) or may include a storage medium such as a magnetic tape, an optical disk, or a magnetic disk. The storage 2700 may store data to be processed by the CPU 100 of the IC 1000 according to an embodiment or data processed by the IC 1000.

The expansion card 2800 may be embodied as a secure digital (SD) card, a multimedia card (MMC), a subscriber identification module (SIM) card, a universal subscriber identity module (USIM), or the like. The network device 2900 may allow the electronic system 2000 to be connected to a wired or wireless network.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to embodiments thereof, it will be understood that various changes in form and details may be made therein without departing from the spirit and scope of the following claims.

What is claimed is:

1. An application processor comprising:
   a plurality of interrupt sources to which interrupt numbers are respectively assigned;
   a Central Processing Unit (CPU) configured to receive an interrupt request signal and an interrupt number signal and perform an interrupt handling process for a first interrupt source of the plurality of interrupt sources, the first interrupt source corresponding to the interrupt number signal; and
   an interrupt controller comprising a master interface connected to a system bus, the interrupt controller being configured to generate the interrupt request signal and the interrupt number signal based on an interrupt signal, which is received from the first interrupt source, and to transmit the interrupt number signal to the CPU via the master interface, wherein:
   the CPU receives:
      the interrupt request signal through direct communication with the interrupt controller that does not employ the system bus, and
      the interrupt number signal, from the interrupt controller, through the system bus.

2. The application processor of claim 1, further comprising:
   a memory connected to the CPU, wherein:
   the CPU is further configured to transmit the interrupt number signal to the memory, and
   the memory is configured to store an interrupt number corresponding to the interrupt number signal.

3. The application processor of claim 2, wherein the CPU is further configured to determine, based on the interrupt number stored in the memory, an interrupt source on which the interrupt handling process is to be performed.

4. The application processor of claim 2, wherein the memory is further configured to store validity information indicating validity of the interrupt number stored in the memory.

5. The application processor of claim 4, wherein the CPU is further configured to determine whether to perform the interrupt handling process, based on the validity information.

6. The application processor of claim 4, wherein, when the interrupt handling process finishes, the CPU is further configured to change the validity information stored in the memory.

7. The application processor of claim 2, wherein the memory is directly connected to the CPU.

8. The application processor of claim 1, wherein the CPU comprises a slave interface, the slave interface of the CPU configured to receive the interrupt number signal via the system bus.

9. The application processor of claim 2, wherein a time interval, in which the interrupt request signal is transmitted from the interrupt controller and reaches the CPU, overlaps a time interval in which the interrupt number signal is transmitted from the interrupt controller and reaches the memory via the CPU.

10. The application processor of claim 1, wherein, when receiving a plurality of interrupt signals, the interrupt controller is configured to select one of the plurality of interrupt signals, as a selected interrupt signal, according to priorities of the plurality of interrupt signals and to generate the interrupt request signal based on the selected interrupt signal.

11. An integrated circuit comprising:
    first and second interrupt sources configured to respectively generate first and second interrupt signals and having first and second interrupt numbers respectively assigned to the first and second interrupt sources;
    an interrupt controller comprising a master interface; and
    a system bus connected to the master interface, wherein:
    the interrupt controller is configured to receive the first and second interrupt signals from the first and second interrupt sources and generate an interrupt request signal based on the first interrupt signal or the second interrupt signal, and
    the master interface is configured to output, to the system bus, an interrupt number signal regarding the first interrupt number or the second interrupt number, wherein:
    the interrupt controller transmits:
       the interrupt request signal through direct communication with a central processing unit that does not employ the system bus, and
       the interrupt number signal, to the central processing unit, through the system bus.

12. The integrated circuit of claim 11, wherein:
    the interrupt controller further comprises a priority register in which priorities of the first interrupt signal and the second interrupt signal are stored, and
    when simultaneously receiving the first interrupt signal and the second interrupt signal, the interrupt controller is further configured to generate the interrupt request signal based on the priorities of the first interrupt signal and the second interrupt signal stored in the priority register.

13. The integrated circuit of claim 11, wherein the interrupt controller further comprises an interrupt number register in which the first interrupt number or the second interrupt number is stored.

14. The integrated circuit of claim 13, wherein the master interface is further configured to output, to the system bus, the interrupt number signal regarding an interrupt number stored in the interrupt number register.

15. An application processor comprising:
a communication bus;
an interrupt source that generates an interrupt signal;
an interrupt controller that generates, in response to receiving the interrupt signal from the interrupt source, an interrupt request signal and an interrupt number, corresponding to the interrupt signal;
a central processing unit (CPU) that receives, from the interrupt controller, the interrupt request signal and the interrupt number; and
a tightly-coupled memory that stores the interrupt number received by the CPU, wherein:
in response to receiving the interrupt request signal, the CPU:
 stores, in the tightly-coupled memory, data pertaining to an interrupted operation being executed at a time the interrupt request signal is received by the CPU,
 retrieves the interrupt number stored by the tightly-coupled memory through direct communication that does not employ the communication bus, and
 communicates an interrupt-processing command to the interrupt source through the communication bus; and
the CPU receives:
 the interrupt request signal through direct communication with the interrupt controller that does not employ the communication bus, and
 the interrupt number, from the interrupt controller, through the communication bus.

16. The application processor of claim 15, wherein a time period during which the interrupt controller generates the interrupt request signal overlaps with a time period during which the interrupt controller generates the interrupt number.

17. The application processor of claim 15, wherein:
the interrupt controller communicates, to the CPU through the communication bus, validity information corresponding to the interrupt request signal that indicates whether the interrupt number is valid, and
the CPU:
 stores the validity information, received from the interrupt controller, within the tightly-coupled memory in association with the interrupt number,
 retrieves the validity information and the interrupt number stored by the tightly-coupled memory through direct communication that does not employ the communication bus,
 determines whether the interrupt source has been serviced based upon the retrieved validity information, and
 communicates the interrupt-processing command to the interrupt source through the communication bus in response to determining that the interrupt source has not been serviced and, otherwise, does not communicate the interrupt-processing command to the interrupt source.

18. The application processor of claim 17, wherein the CPU changes the validity information stored by the tightly-coupled memory, after communicating the interrupt-processing command to the interrupt source, to indicate that the interrupt source has been serviced.

* * * * *